April 13, 1937.  E. J. TE PAS  2,077,284
AUTOMOBILE RADIO RECEIVER
Filed Oct. 25, 1933  2 Sheets-Sheet 1

INVENTOR
Edmund J. Te Pas

April 13, 1937.  E. J. TE PAS  2,077,284
AUTOMOBILE RADIO RECEIVER
Filed Oct. 25, 1933  2 Sheets-Sheet 2

INVENTOR
Edmund J. Te Pas

Patented Apr. 13, 1937

2,077,284

UNITED STATES PATENT OFFICE 2,077,284

AUTOMOBILE RADIO RECEIVER

Edmund J. Te Pas, Rocky River, Ohio, assignor to Walter A. Frantz, Cleveland Heights, Ohio Application October 25, 1933, Serial No. 695,129

9 Claims. (Cl. 250—14)

This invention relates to radio reception apparatus and in particular radio receiving sets adapted for use in connection with automobiles.

One of the objects of this invention is the provision of a readily removable and replaceable radio receiving set for use in connection with automobiles in which all of the operating parts of the set are formed as a single unitary structure.

Another object of this invention is the provision of a novel arrangement for slidably and removably supporting an automobile receiving set.

Another object of this invention is the provision of an automobile radio receiving set which can be readily installed in an automobile with the controls of the set in position to be operated from the instrument panel of the automobile.

Another object of this invention is the provision of a readily removable radio receiving set which can be readily removed from the automobile for use elsewhere with an electrical current supply of different type and voltage than that provided by the automobile.

With these and other objects in view, the invention consists in the novel construction, arrangement and combination of parts, hereinafter illustrated and described in some of its embodiments in the accompanying drawings, and particularly pointed out in the appended claims.

In the drawings, Figure 1 is a side elevational view of a radio receiver removably mounted beneath the cowl of an automobile with the controls of the receiver located in the plane of the instrument panel of the car.

Figure 1:
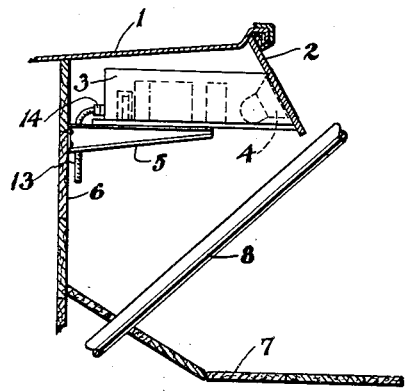
Figure 2:
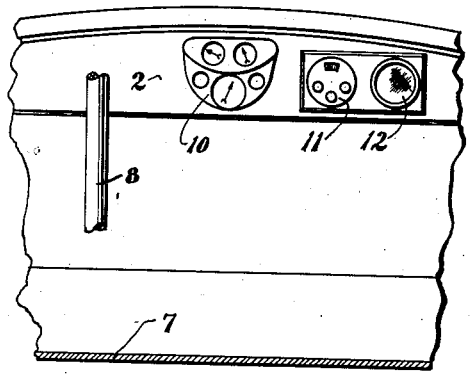
Figure 2 is a front elevational view of the arrangement shown in Figure 1.

Referring to the form of the invention shown in Figures 1 and 2, the numeral 1 indicates the cowl of an automobile which has an instrument panel 2 located at the rear edge thereof. Beneath the cowl and behind the instrument panel there is located a radio receiving set 3 having a loud speaker 4 which is arranged when the set is operating to direct sound waves in a direction toward the occupants of the car. The receiving set 3 is housed within a suitable casing which is slidably and removably carried on a support 5 secured to front wall 6 of the body of the automobile.

The numerals 7 and 8 indicate respectively the floor boards and steering column of the car and the numeral 10 indicates the instrument assembly carried by the instrument panel 2. The panel 2 has an aperture of sufficient size for receiving the case of the radio receiver. The controls 11 and the loud speaker of the set are located at the forward end of its case or cabinet. The controls include the customary volume and tone control knobs as well as the station selector knob and indicator dial. The loud speaker is concealed behind a screen 12 and the set itself forms a complete and unitary installation.

In order to facilitate the removal or replacement of the set the aerial, ground and power supply connections of the set are effected by means of a single separable plug connection 14 which is provided with suitable terminals connected to the necessary conductor strands which are provided in a cable 13. The operating parts of the set are not illustrated in detail as they do not form a part of this invention. It is to be understood that all of the operating parts of the set are housed within a single casing including the necessary means for converting six volt direct current supply of the storage battery of the automobile to the type and voltage of current required for the operation of the set.

It is also within the comptemplation of this invention to include in the set provisions for its use with the customary house lighting supply currents so that if desired the set can be removed from the car by reason of the arrangement shown and used elsewhere with a different type of electrical current. The additional apparatus necessary for the foregoing purpose would include voltage reducing and current converting devices for changing the house lighting supply current to six volt direct current which current is then used in the same manner as the current supplied by the automobile battery in operating the set. A set of this type is illustrated in detail in copending application Serial No. 679,856 filed July 11, 1933 by W. A. Frantz and P. D. Kendall and owned by the assignee of the instant application. The front end of the set shown in Figures 1 and 2 is finished so as to harmonize with the instrument panel of the car.

Figure 3:
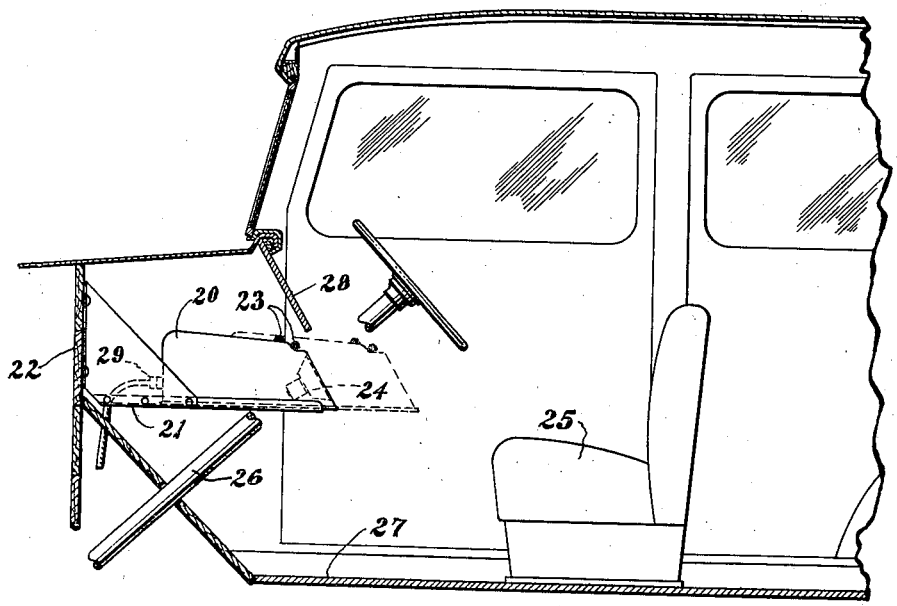
Figure 3 is a side elevational view illustrating another form of radio receiving set and different method of adjustably and removably carrying the same.

In the form of the invention shown in Figure 3 the case of the receiving set 20 is slidably and removably carried on a supporting structure 21 which is fixedly secured to the front wall 22 of the body of the car. At the top and forward end part of the receiver case the customary control knobs 23 are located and a loud speaker 24 is provided at this end of the set in a position to direct sound waves directly toward the car occupants. The case of the set is arranged to be shifted from an inoperative position as shown in full lines to an operative position as shown in dotted lines where the set is in position where it can be operated conveniently by the occupants of the front seat 25 of the automobile.

The steering column of the car is indicated by the numeral 26, the numeral 27 indicates the floor boards of the front part of the car and the car instrument panel is indicated by the numeral 28. As in the case of the device shown in Figures 1 and 2 the aerial, ground and power supply connections of the set are effected by means of a removable plug connection 29.

Figures 4, 5:
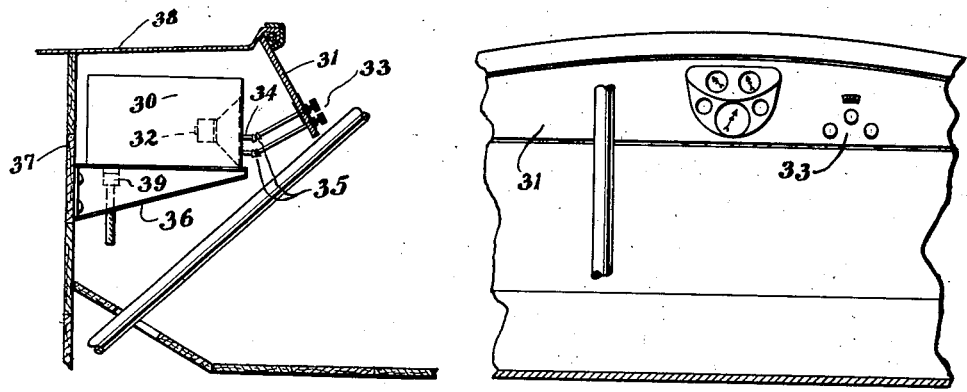
Figure 4 is a side elevational view showing another form of radio receiver and a different form of receiver support.
Figure 5 is a front elevational view of the arrangement shown in Figure 4.

In the form of the invention shown in Figures 4 and 5, the case of the receiver 30 is located at a short distance from the instrument panel 31 of the automobile. The loud speaker of this set is at the forward end thereof and the set controls 33, including the control knobs and station indicator, are carried by the instrument panel 31. The control knobs are connected by suitable rods 34 and universal joints 35 to the operating parts of the set.

The case of the set is removably carried on suitable support 36 fixedly secured to the front wall 37 of the body of the car, the set being located beneath the cowl 38 and behind the instrument panel 31 where it is out of the way of the occupants of the front seat of the car. As in the case of the preceding forms of the invention the aerial, ground and power supply connections for the set are effected by means of a separable plug 39.

Figure 6:
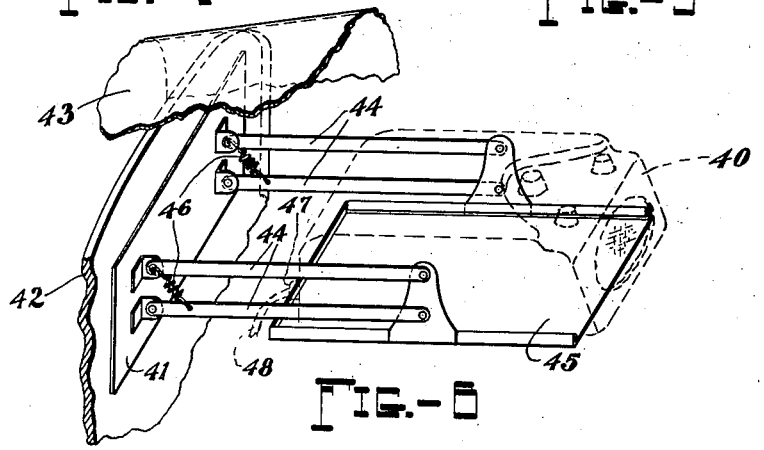
Figure 6 is a perspective view of another form of radio receiver support for use in connection with an automobile radio receiver of the type shown in Figure 3.

In the form of the invention illustrated in Figure 6 the radio receiving set 40 is slidably and removably carried on a movable support which has a part 41 fixedly secured to the front wall 42 of the body of the automobile. This support is located beneath the cowl 43 and behind the instrument panel (not shown) of the car so that the set can be moved to a concealed position behind the instrument panel when not in use and when it is to be used it can be lowered and slid to a forward operating position. The support in this form of the invention comprises a part 41 which is fixedly secured to the front wall 42 of the car. To this part 41 there is pivotally secured a set of four parallel arms 44. At the forward ends of these arms there is pivotally secured a pan 45 which is arranged to slidably support the case of the radio receiver 40.

A pair of springs 46 are provided to counterbalance the weight of the set. The friction of the pivotal connections between the parallel arms 44 and the supporting member 43 and the plate 45 can be made sufficient to maintain the set in any of its various positions. As in the case of the preceding forms of the invention the aerial, ground and power supply connections are effected by means of a removable plug 47 which is attached to one end of a cable 48 in which the necessary conductors are provided for effecting such connections.

Figures 7, 8:
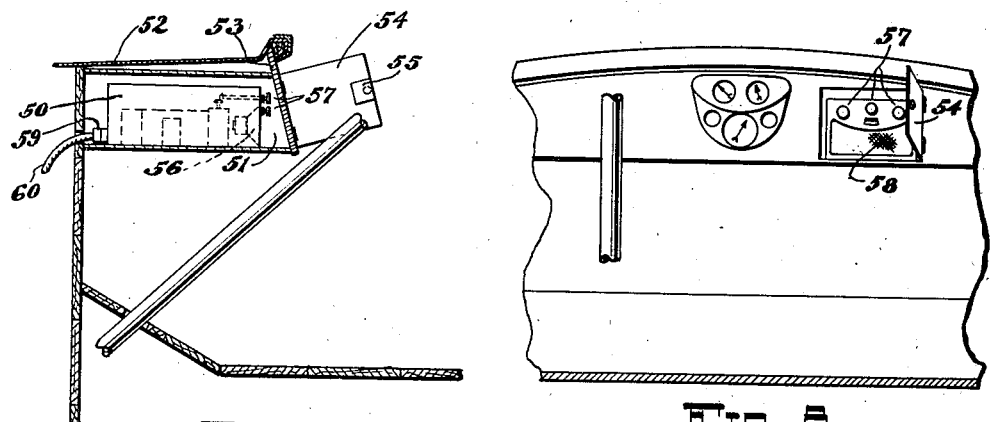
Figure 7 is a side elevational view of yet another form of automobile radio receiver and its support.
Figure 8 is a front elevational view of the arrangement shown in Figure 7.

In the form of the invention shown in Figures 7 and 8 the case of the receiver 50 is slidably and removably carried in a compartment 51 located beneath the cowl 52 and behind the instrument panel 53 of the car. This compartment is provided with a door 54 which may be provided with a lock 55 so that the door may be closed and locked when the set is not in use. The receiver in this case is provided with a loud speaker 56 at its forward end and the customary controls 57 which are also secured in place at the front end of the set so that they may be readily manipulated by the occupants of the front seat of the car.

The loud speaker 56 is concealed behind the screen 58. As in the preceding forms of the invention the aerial, ground and power supply connections of the set are effected by means of a removable plug 59 which is attached to a cable 60 in which are located the conductors required for this purpose.

In most of the forms of the invention all of the parts of the receiving set are contained within a single case which is arranged in conjunction with certain of the parts of the automobile so that it may be readily removed or replaced. The use of a single plug connection for hooking up the set makes it a very easy matter to remove the set for use elsewhere. Better reception of broadcasting programs is made possible by locating the loud speaker so that sound waves are directed directly to the listeners and also by positioning the loud speaker as far away from the engine of the car as possible while carrying out at the same time some of the other features of the invention.

Furthermore it is to be understood that the particular forms of apparatus shown and described, and the particular procedure set forth are presented for purposes of explanation and that various modifications of said apparatus and procedure can be made without departure from this invention as described in the appended claims.

Having thus described my invention what I claim is:

1. An automobile radio receiving set for use by the occupants of the front seat of an automobile comprising, a case for the loud speaker and the other operating parts of the set including control devices for the receiver located on the outside of the case, and means for supporting said case forwardly of the front seat of the automobile for movement towards and away from the same, the loud speaker of the set being arranged to direct the generated sound waves in a direction upward and toward the rear of the automobile.

2. An automobile radio receiving set comprising, a case for the loud speaker and the other operating parts of the set including control devices for the receiver carried on the outside of the case, and means for supporting said case beneath the cowl of the automobile for movement towards and away from the front seat thereof, the loud speaker of the set being arranged to direct the generated sound waves in a direction upward and toward the rear of the automobile.

3. An automobile radio receiving set comprising, a case for the loud speaker and the other operating parts of the set including control devices for the receiver located on the outside of the case, and means for supporting said case for movement from a concealed position behind the instrument board of the machine to an operative position with part of the case extending in front of the instrument board.

4. An automobile radio receiving set comprising, a case for the operating parts of the set including control devices for the receiver carried on the outside of the case, means for supporting said case beneath the cowl of an automobile for compound movement whereby the case can be moved downwardly and outwardly from a hidden position behind the instrument board of the automobile to an exposed and operative position with a part of said case projecting in front of said instrument board.

5. An automobile radio receiving set comprising, a case for the loud speaker and the other operating parts of the set including control devices for the receiver carried on the outside of the case, means for removably supporting said case in front of the front seat of the automobile with the control devices of the set in position to be manipulated by the occupants of the seat, and a single separable connection for effecting the power supply, aerial and ground connections of said set, the loud speaker of the set being positioned so as to direct the emitted sound waves above the occupants of the front seat.

6. An automobile radio receiving set comprising, a case for the loud speaker and the other operating parts of the set, means for displaceably supporting said set for movement from a normally concealed position behind the instrument panel of the automobile to an exposed position in which the loud speaker of the set extends forwardly of the instrument panel, and control devices located at the forward end of said case for controlling the operation of the set when in its exposed position.

7. An automobile radio receiving set comprising, a case for the loud speaker and the other operating parts of the set including control devices for the receiver located on the outside of the case, and means for supporting said set in front of the front seat of an automobile for movement from a working position where the set may be operated by the occupants of such seat to an inoperative position where the set is out of the way of the occupants of the front seat, the loud speaker of the set being positioned so as to direct the emitted sound waves above the occupants of the front seat.

8. An automobile radio receiving set comprising, a case for the operating parts of the set including control devices for the receiver located on the outside of the case, and means for displaceably supporting said case for downward and forward movement from a fully concealed normally inoperative position beneath the cowl of the automobile to an exposed operative position in which the controls of the set may be manipulated by the occupants of the front seat of an automobile.

9. A radio receiving set for automobiles comprising, a case for the operating parts of the set which include a loud speaker and control devices both located at one end of the case, and means for supporting said case in front of the front seat of an automobile with the control devices in position for manipulation by the occupants of the front seat and with the loud speaker of the set directed upwardly and towards the rear of the car and located adjacent to and forwardly of the instrument board thereof at the end of said case nearest to the front seat of the automobile.

EDMUND J. TE PAS.